United States Patent
Avrutsky

(10) Patent No.: US 10,333,405 B2
(45) Date of Patent: Jun. 25, 2019

(54) SYSTEMS AND METHODS FOR ENHANCED EFFICIENCY AUXILIARY POWER SUPPLY MODULE

(71) Applicant: Tigo Energy, Inc., Los Gatos, CA (US)

(72) Inventor: Mordechay Avrutsky, Alfei Menashe (IL)

(73) Assignee: TIGO ENERGY, INC., Los Gatos, CA (US)

( * ) Notice: Subject to any disclaimer, the term of this patent is extended or adjusted under 35 U.S.C. 154(b) by 0 days.

(21) Appl. No.: 15/969,607

(22) Filed: May 2, 2018

(65) Prior Publication Data

US 2018/0254701 A1 Sep. 6, 2018

Related U.S. Application Data

(63) Continuation of application No. 15/392,960, filed on Dec. 28, 2016, now Pat. No. 9,966,848, which is a
(Continued)

(51) Int. Cl.
| | |
|---|---|
| *H02M 3/158* | (2006.01) |
| *H02M 3/07* | (2006.01) |
| *H02M 1/08* | (2006.01) |
| *H02M 1/36* | (2007.01) |
| *H02M 1/00* | (2006.01) |

(52) U.S. Cl.
CPC ............ *H02M 3/158* (2013.01); *H02M 1/08* (2013.01); *H02M 3/07* (2013.01); *H02M 1/36* (2013.01); *H02M 2001/007* (2013.01); *H02M 2001/008* (2013.01); *Y02E 10/56* (2013.01)

(58) Field of Classification Search
None
See application file for complete search history.

(56) References Cited

U.S. PATENT DOCUMENTS

| | | | |
|---|---|---|---|
| 4,719,553 | A | 1/1988 | Hinckley |
| 5,235,266 | A | 8/1993 | Schaffrin |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.
(Continued)

*Primary Examiner* — Jeffrey A Gblende
(74) *Attorney, Agent, or Firm* — Greenberg Traurig, LLP

(57) ABSTRACT

A power supply for use in a solar electric production system, including: a first stage having an input connected to a voltage from a photovoltaic panel and an output providing a first voltage different from the voltage from the photovoltaic panel; and a second stage connected to the output of the first stage, the second stage supplying power at a second voltage to a micro-controller, where the output of the first stage is turned on and stable for a period of time before the second stage is turned on to supply the power at the second voltage to the micro-controller.

13 Claims, 6 Drawing Sheets

Related U.S. Application Data continuation of application No. 14/822,227, filed on Aug. 10, 2015, now Pat. No. 9,584,021, which is a continuation of application No. 12/787,205, filed on May 25, 2010, now Pat. No. 9,143,036.

(60) Provisional application No. 61/336,743, filed on Jan. 26, 2010, provisional application No. 61/275,734, filed on Sep. 2, 2009.

(56) References Cited

U.S. PATENT DOCUMENTS

| | | | |
|---|---|---|---|
| 5,268,832 A | 12/1993 | Kandatsu | |
| 5,565,761 A * | 10/1996 | Hwang | H02M 1/4208 323/222 |
| 5,604,430 A | 2/1997 | Decker et al. | |
| 5,903,138 A | 5/1999 | Hwang et al. | |
| 5,923,158 A | 7/1999 | Kurokami et al. | |
| 6,275,016 B1 | 8/2001 | Ivanov | |
| 6,448,489 B2 | 9/2002 | Kimura et al. | |
| 6,650,031 B1 | 11/2003 | Goldack | |
| 6,844,739 B2 | 1/2005 | Kasai et al. | |
| 6,894,911 B2 | 5/2005 | Telefus et al. | |
| 6,984,970 B2 | 1/2006 | Capel | |
| 7,061,214 B2 | 6/2006 | Mayega et al. | |
| 7,202,653 B2 | 4/2007 | Pai | |
| 7,248,946 B2 | 7/2007 | Bashaw et al. | |
| 7,256,566 B2 | 8/2007 | Bhavaraju et al. | |
| 7,276,886 B2 | 10/2007 | Kinder et al. | |
| 7,301,313 B1 | 11/2007 | Hart et al. | |
| 7,397,151 B2 | 7/2008 | Ishino | |
| 7,411,316 B2 | 8/2008 | Pai | |
| 7,518,346 B2 | 4/2009 | Prexl et al. | |
| 7,560,915 B2 | 7/2009 | Ito et al. | |
| 7,595,616 B2 | 9/2009 | Prexl et al. | |
| 7,605,498 B2 | 10/2009 | Ledenev et al. | |
| 7,719,140 B2 | 5/2010 | Ledenev et al. | |
| 7,821,281 B2 | 10/2010 | Chen | |
| 8,004,866 B2 | 8/2011 | Bucella et al. | |
| 8,013,472 B2 | 9/2011 | Adest et al. | |
| 8,035,249 B2 | 10/2011 | Shaver, II et al. | |
| 8,427,009 B2 | 4/2013 | Shaver, II et al. | |
| 8,531,055 B2 | 9/2013 | Adest et al. | |
| 8,587,151 B2 | 11/2013 | Adest et al. | |
| 8,669,675 B2 | 3/2014 | Capp et al. | |
| 8,816,535 B2 | 8/2014 | Adest et al. | |
| 8,947,194 B2 | 2/2015 | Sella et al. | |
| 9,112,379 B2 | 8/2015 | Sella et al. | |
| 9,143,036 B2 | 9/2015 | Avrutsky | |
| 9,401,599 B2 | 7/2016 | Har-Shai et al. | |
| 9,438,035 B2 | 9/2016 | Capp et al. | |
| 9,584,021 B2 | 2/2017 | Avrutsky | |
| 9,590,526 B2 | 3/2017 | Adest et al. | |
| 9,966,848 B2 | 5/2018 | Avrutsky | |
| 2003/0048003 A1 | 3/2003 | Daniels et al. | |
| 2005/0017701 A1 | 1/2005 | Hsu | |
| 2005/0040800 A1 | 2/2005 | Sutardja | |
| 2005/0057214 A1 | 3/2005 | Matan | |
| 2005/0057215 A1 | 3/2005 | Matan | |
| 2005/0099164 A1 * | 5/2005 | Yang | H02M 1/4225 323/266 |
| 2006/0001406 A1 | 1/2006 | Matan | |
| 2006/0158165 A1 | 7/2006 | Inn et al. | |
| 2006/0174939 A1 | 8/2006 | Matan | |
| 2006/0176031 A1 | 8/2006 | Forman et al. | |
| 2006/0185727 A1 | 8/2006 | Matan | |
| 2007/0001653 A1* | 1/2007 | Xu | H02M 3/158 323/225 |
| 2007/0273351 A1 | 11/2007 | Matan | |
| 2007/0278861 A1* | 12/2007 | Lou | G05F 1/56 307/66 |
| 2008/0100233 A1 | 5/2008 | Negoi | |
| 2008/0121272 A1 | 5/2008 | Besser et al. | |
| 2008/0122449 A1 | 5/2008 | Besser et al. | |
| 2008/0122518 A1 | 5/2008 | Besser et al. | |
| 2008/0179949 A1* | 7/2008 | Besser | H02J 7/0068 307/24 |
| 2008/0191560 A1 | 8/2008 | Besser et al. | |
| 2008/0191675 A1 | 8/2008 | Besser et al. | |
| 2008/0303503 A1 | 12/2008 | Wolfs | |
| 2009/0067208 A1* | 3/2009 | Martin | H02J 17/00 363/126 |
| 2009/0134858 A1* | 5/2009 | Chen | G05F 1/56 323/282 |
| 2009/0237146 A1* | 9/2009 | Jurasek | H02M 3/07 327/536 |
| 2010/0013452 A1 | 1/2010 | Tang et al. | |
| 2010/0117614 A1 | 5/2010 | Bandholz et al. | |
| 2011/0031946 A1 | 2/2011 | Egan et al. | |
| 2011/0050190 A1 | 3/2011 | Avrutsky | |
| 2011/0148388 A1 | 6/2011 | Zanchi et al. | |
| 2015/0349644 A1 | 12/2015 | Avrutsky | |
| 2017/0110966 A1 | 4/2017 | Avrutsky | |

FOREIGN PATENT DOCUMENTS

| | | |
|---|---|---|
| DE | 19961705 | 7/2001 |
| EP | 1388774 | 2/2004 |
| ES | 2249147 | 3/2006 |
| WO | 2003012569 | 2/2003 |

OTHER PUBLICATIONS

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronics, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application No. PCT/US2010/046272, International Search Report and Written Opinion, dated Mar. 31, 2011.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Eurosun 96, pp. 819-824, Sep. 16, 1996.

Roman, Eduardo, et al., "Intelligent PV Module for Grid-Connected PV Systems," IEEE Transactions on Industrial Electronics, vol. 53, No. 4, pp. 1066-1073, Aug. 2006.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Walker, Geoffrey R. et al., "Cascaded DC-DC Converter Connection of Photovoltaic Modules," IEEE Transactions on Power Electronics, vol. 19, No. 4, pp. 1130-1139, Jul. 2004.

* cited by examiner ns AND METHODS FOR ENHANCED
EFFICIENCY AUXILIARY POWER SUPPLY
MODULE

RELATED APPLICATIONS

The present application is a continuation application of U.S. patent application Ser. No. 15/392,960, filed Dec. 28, 2016 and issued as U.S. Pat. No. 9,966,848 on May 8, 2018, which is a continuation application of U.S. patent application Ser. No. 14/822,227, filed Aug. 10, 2015, and issued as U.S. Pat. No. 9,584,021 on Feb. 28, 2017, which is a continuation application of U.S. patent application Ser. No. 12/787,205, filed May 25, 2010 and issued as U.S. Pat. No. 9,143,036 on Sep. 22, 2015, which claims the benefit of filing dates of U.S. Prov. App. Ser. No. 61/275,734, filed Sep. 2, 2009, and Prov. U.S. App. Ser. No. 61/336,743, filed Jan. 26, 2010, the entire disclosures of which applications are hereby incorporated herein by reference.

FIELD OF THE TECHNOLOGY

At least some embodiments of this disclosure relate to photovoltaic systems in general, and more particularly but not limited to, enhancing the efficiency for auxiliary power supply modules used in photovoltaic systems.

BACKGROUND

Typically, power supplies or power supply modules used for photovoltaic systems may provide, for example, 3.3V to be used as a main supply voltage, in most applications when the photovoltaic system needs to maintain low voltage for energy-saving purposes. However, when the power supplies are driving the metal-oxide-semiconductor field-effect transistors (MOSFET) or similar devices or switches contained within the photovoltaic systems, the power supplies or power supply modules of photovoltaic systems may have to provide higher voltage levels such as, for example, 10V to 12V. Keeping the main supply of the control circuit and the overall power supply module at, for example, 3.3.V may be preferable in order to maintain ideal energy-savings for the operation of photovoltaic systems.

SUMMARY OF THE DESCRIPTION

Systems and methods in accordance with the present disclosure are described herein. Some embodiments are summarized in this section.

In one of many embodiments of the disclosure, provided is a power supply for use in a solar electric production system. The power supply includes: a first stage having an input connected to a voltage from a photovoltaic panel and an output providing a first voltage different from the voltage from the photovoltaic panel; and a second stage connected to the output of the first stage, the second stage supplying power at a second voltage to a micro-controller, where the output of the first stage is turned on and stable for a period of time before the second stage is turned on to supply the power at the second voltage to the micro-controller.

In another embodiment, provided is a power supply for use in a solar electric production system. The power supply includes: a first stage having an input and an output, the input of the first stage to receive power from a photovoltaic panel, the output of the first stage to provide a first voltage different from the voltage received at the input of the first stage; a switchable load; a second stage having an input connected to the output of the first stage, the second stage to supply power at a second voltage to an micro-controller; and a control circuit to provide a signal to the switchable load to switch off the switchable load prior to providing a signal to the second stage to enable output from the second stage to the micro-controller.

Other embodiments and features of the present disclosure will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Provided is a system and method for an auxiliary power supply module used in a photovoltaic system to increase the efficiency of the photovoltaic system and reduce maintenance responsibilities of the system, or housekeeping requirements, wherein housekeeping roughly means the energy, power or voltage requirements needed to operate controls and switches of a photovoltaic system that converts sunlight into electricity, as well as to manage and control directly associated tasks, including but not limited to communication operations and so on. This increase in efficiency and power savings may be achieved by designing a photovoltaic system where the efficiency curve is as flat as possible. For example, in order to achieve such efficiency objectives, an internal auxiliary power supply having reduced power consumption may be used to drive the MOSFETs of a photovoltaic system at the lower power end of the efficiency curve in order to ultimately obtain the most efficient power savings possible.

One application of the present disclosure is to power control circuits for a solar panel using the power generated by the solar panel. For example, a power supply module of one embodiment is used to power the link module (200) using the electricity generated by the photovoltaic panel (101*n*) described in U.S. patent application Ser. No. 11/875, 799, published now as U.S. Pat. App. Pub. No. 2008/0097655. For example, a power supply module of one embodiment is used to power the local management unit (LMU) (101) using the electricity generated by the solar module (102) described in U.S. patent application Ser. No. 12/411,317, now issued as U.S. Pat. No. 7,602,080. In one embodiment, a sun can be shown along with any of the above-referenced Figures—illustrate that the sun may be the source of photovoltaic energy absorbed by a solar panel, for instance. The contents of the above discussed patent and publication are incorporated herein by reference.

Figure 1:
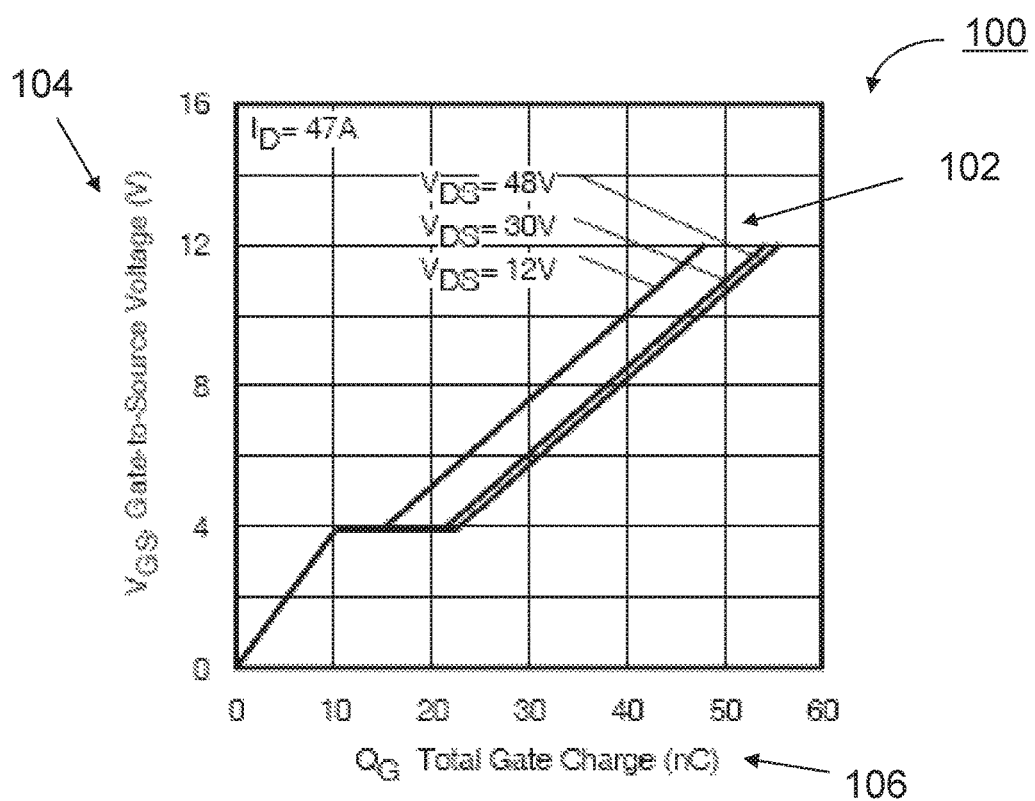
FIG. 1 shows an example gate charge vs. gate-to-source voltage diagram according to an embodiment of the present disclosure.

FIG. 1 shows an example gate charge vs. gate-to-source voltage diagram according to an embodiment of the present disclosure. Gate charge (QG) vs. gate-to-source voltage (VGS) diagram (100) comprises at least one drain-to-source voltage (VDS) curve (102), a gate-to-source voltage (VGS) axis (104), having a unit of measurements of Volts, and a total gate charge (QG) axis (106), having a unit of measurement of Coulombs, or capacitive charge, or in the specific case of FIG. 1, nano-Coulombs (nC).

FIG. 1 analyzes the gate, drain and source of a typical MOSFET transistor that may be used in a photovoltaic system, for example. According to an embodiment of the present disclosure, driving the gate of the MOSFET relative to the source with a lower voltage value (low VGS values on the gate-to-source voltage axis (104)) may yield energy savings for the associated voltage drive at, for example, saving roughly twice the amount of energy compared to using high-voltage values). Note also that the slope (change in gate-to-source voltage over change in total gate charge) is slightly higher for lower values of VGS as opposed to higher values of VGS, which may mean greater power efficiency overall. Both the lowered voltage of the gate-to-source voltage VGS and the lowered internal gate capacity (which in turn reduces the charge or discharge current across the gate) result in a roughly quadratic savings of power. This power savings allows a photovoltaic system to achieve great reduction in housekeeping energy supply, by using an "adaptive" gate drive that adapts power consumption based on the amount of gate driving voltage provided. Therefore, as can be seen in FIG. 1, the reduction in gate charge is linear in relation to the gate-to-source voltage VGS.

MOSFETs have a threshold input voltage, above which the transistor is substantially in full conduction mode or in saturation mode. For safe operation and full conduction, the minimum gate voltage should be at least 1V above the minimum threshold voltage value. Even if full saturation is not achieved, particularly at the low end of the power range, a loss in switching efficiency may be small, whereas at the same low end of the power range, housekeeping energy may suddenly become an issue. Adjusting the gate drive voltage is required to reduce the auxiliary supply current at low load conditions, whereas the effective resistance between the drain and the source of a MOSFET (RDS) has little to no influence on switching efficiency. For a MOSFET above its turn-on threshold voltage, the total gate charge value versus normal gate charge value is a straight line, as is well known in the art, meaning that the behavior per each load current exhibits constant capacitance. Therefore, the gate drive current may behave according to $\frac{1}{2}CV^2f$, where C=the equivalent capacitance, V=the gate voltage, and f=operating frequency. Thus it is clear that reducing the gate voltage from 11V to 7V may reduce the drive current by more than two orders of magnitude. At the same time that the RDSon (the resistance between the drain and the source of a MOSFET switch (or other FET switch) when fully on) is increased by less than 1.5 times its 12V value. At light load conditions (less than 30 percent of a standard-rated load) the change in RDSon does not affect the overall efficiency of the overall MOSFET transistor or of the photovoltaic system.

Figure 2:
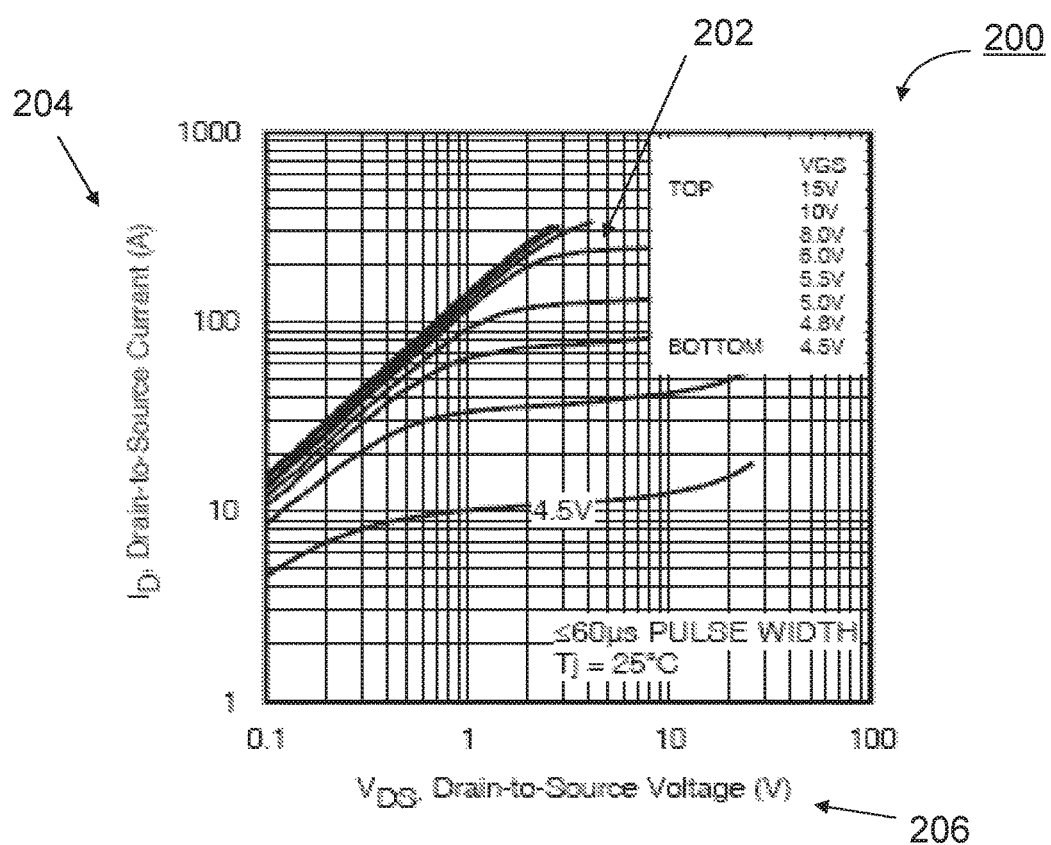
FIG. 2 shows a diagram illustrating RDSon behavior as a function of VGS (voltage between gate and source of a FET) according to an embodiment of the present disclosure.

FIG. 2 shows a diagram illustrating RDSon behavior as a function of VGS (voltage between gate and source of a FET) according to an embodiment of the present disclosure. Drain-to-source voltage (VDS) to drain-to-source Current (ID) diagram (200) comprises at least one gate-to-source voltage (VGS) curve 202, a drain-to-source Current (ID) axis 204, and a drain-to-source voltage (VDS) axis 206. As can be seen from FIG. 2, a gate-to-source voltage value (VGS) between 15V to 6V does not affect the resistance significantly up to a 1V drop which is the range of RDSon (the resistance between the drain and the source of a MOSFET when fully on) for the switching area. The resistance is not effected significantly up to a 1V drop because the MOSFET is in saturation mode, and because VDS=I*RDSon and RDSon is a function of both VGS and VDS, so when VGS changes, the RDSon value is affected. As also can be observed from FIG. 2, the slope (change in ID over change in VDS) increases for higher values of VGS and begin to decrease and plateau for lower values of VGS. This implies that there is an optimal VGS value to drive the gate voltage at in order to still be efficient and not affect the range of RDSon, which is desired in order to avoid any excessive power consumption from the resistance of RDSon.

Further details about characteristics of MOSFETs in one embodiment (e.g., used as switches for controlling the output of solar panels) may be provided in IRF8101E/S/SLPbF data sheet from International Rectifier, which is hereby incorporated herein by reference.

Figure 3:
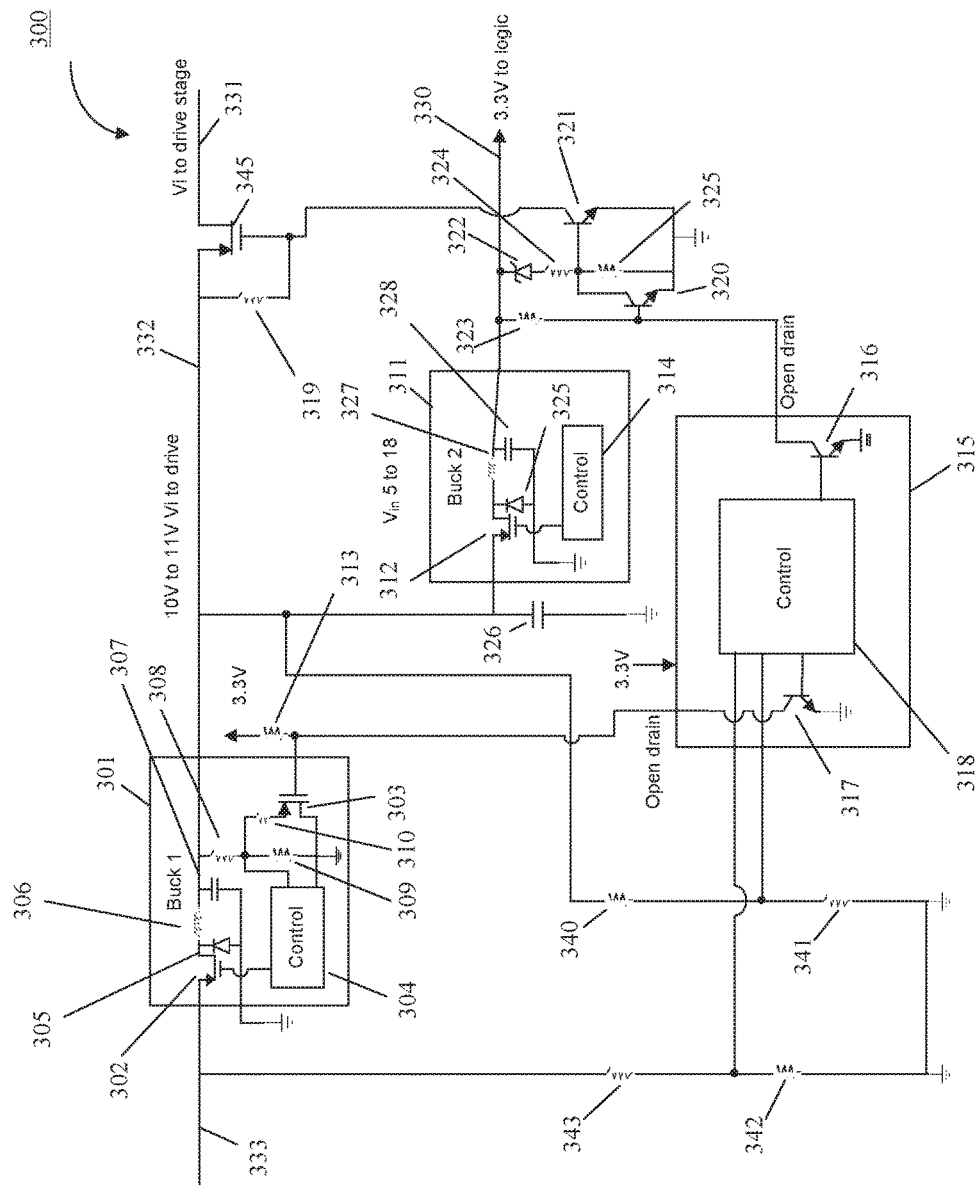
FIG. 3 shows a schematic description of an auxiliary circuit according to an embodiment of the present disclosure.

FIG. 3 shows a schematic description of an auxiliary circuit according to an embodiment of the present disclosure. Auxiliary circuit (300) is a circuit designed to control the auxiliary power for a photovoltaic system, for example. In one embodiment, the auxiliary circuit (300) receives in the input terminal (333) electricity from the photovoltaic panel (101n) described in U.S. patent application Ser. No. 11/875,799, or from the solar module (102) described in U.S. patent application Ser. No. 12/411,317. In one embodiment, the auxiliary circuit (300) provides in one output terminal (330) a voltage for control logic, such as the link module (200) described in U.S. patent application Ser. No. 11/875,799 or the controller (109) described in U.S. patent application Ser. No. 12/411,317. In one embodiment, the circuit (300) provides in one output terminal (331) a voltage for driving a switch, such as a switch having characteristics shown in FIGS. 1 and 2, which can be used as a switch in the link module (200) described in U.S. patent application Ser. No. 11/875,799, or a switch (106) and/or a switch (108) described in U.S. patent application Ser. No. 12/411,317.

In one embodiment, the auxiliary circuit (300) includes step-down converters, such as a buck converter (301) to drive a first voltage output (331) and a buck converter (311) to drive a second voltage output (330). The auxiliary circuit (300) uses capacitor (326) as a backup power supply in order to keep buck converter (311) running longer than buck converter (301). In other words, capacitor (326) is charged by buck converter (301) and used by buck converter (311) as a power supply such that the output of buck converter (311) lasts longer than the output of buck converter (301). If the output of buck converter (301) is out or unstable for a little while, buck converter (311) can still keep the auxiliary circuit (300) working properly at 3.3V for this short period of power outage or instability. Thus, the control logic powered by the voltage (330) will have enough power to provide appropriate control signals, until the drive stage powered by the voltage (331) loses the power (e.g., to operate the switch for the solar panel). Utilizing capacitor (326) may be beneficial in situations where the solar panel is temporarily out of power, such as, for example, when the solar panel is covered by a falling leaf or a bird flying by or a brief shadow.

In one embodiment, auxiliary circuit (300) has input voltage (333), buck converter (301), voltage (332), MOSFET (345), drive voltage (31), resistor (319), resistor (313), capacitor (326), buck converter (311), 3.3.V logic supply output (330), diode (322), resistors (323, 324, 325), transistors (320, 321), control block (315), and resistors (341, 342, 343, 340). The buck converter (301) has: MOSFET (302), diode (305), inductor (306), resistors (308, 309, 310), capacitor (307), MOSFET (303), and control (304). The buck converter (311) has: MOSFET (312), diode (325), inductor (327), capacitor (328) and control (314). Various known converters can be used to replace the voltage conversion portion of the buck converters (301 and 311), such MOSFET (302), diode (305), inductor (306) and capacitor (307) in the buck converter (301), or MOSFET (312), diode (325), inductor (327) and capacitor (328) in the buck converter (311). Therefore, the details shown in buck converter (303) and buck converter (311) are merely illustrative, and other types of buck converters known in the art may be used. In one embodiment, control block 315 has: control circuit (318), and transistors (317, 316). The control circuits 304, 314 and 318 may be interconnected via one or more control signals or connected to one source, such as a micro-controller, although this embodiment is not explicitly shown in FIG. 3. In one embodiment, the control circuit (318) controls the operations of the control (304) and control (314).

In auxiliary circuit (300), drive voltage (331) is controlled by a serial MOSFET (345) and resistor (319). Before enabling the serial MOSFET (345), transistor (321) is to be turned on by meeting at least the following two conditions: (i) 3.3V logic supply (330), for example, is on and higher than at least, for example, 2.6V. (ii) At this particular voltage level, the threshold formed by Zener diode (322) and resistors (324) and (325), as well as when the VBE (base-emitter voltage) of transistor (321) (if transistor (321) comprises a bipolar transistor instead of a MOSFET) activates transistor (321), thus making the control circuit (318) operative and able to control transistor (316) to change from open collector to conductive or on (if transistor (316) is a bipolar transistor, for example). Resistor (323) further enables the 3.3V logic supply (330), for example, to be used in operation with transistor (320) (transistor (320) shown as being a bipolar transistor in FIG. 3). According to an embodiment of the present disclosure, a MOSFET is used instead of a bipolar transistor for some or all of the bipolar transistors (e.g. (321), (316), (320)) shown in FIG. 3 and throughout the present disclosure. Voltages and/or resistors can be adjusted for the use of MOSFETs, instead of bipolar transistors, to properly accommodate such substitution. In one embodiment, the enable circuit (320, 321, 322, 323, 324, 325, 345, 319) connects the output of buck converter (301) to its load (e.g., MOSFET switches, see description below for FIG. 4) only when the 3.3V output is stable and above a 2.6V threshold, for example.

Transistor (316) and control circuit (318) are both internal to control block (315), the control circuit (318) being naturally defined by default in the "open drain" state when turned on. When the above-described two conditions are met, transistor (321) enables MOSFET (345) to turn on the drive voltage to power the Vi for the drive stage output (331). That is, in other words, drive stage output (331) may not actually receive a drive voltage when the control circuit is not operating. The control circuit may disable the drive voltage during other conditions, such as a low output voltage from buck converter (301) sensed by resistors (340) and (341) and connected to control circuit (318). Buck converter (301) may yield a wide range of voltage for the input voltage (333). Buck converter (301) also is controlled by control (304) and feedback from transistor (303). Resistors (342) and (343) connect the input voltage (333) to transistor (302), and the node in between the middle of resistors (342) and (343) may be directly connected to the control circuit (318) of control block (315). Low logic voltage may shut-down the voltage for the drive stage output (331). A wide operation range may be easily achieved by buck converter (301). The buck converter (301) may also be turned on when the input voltage (333) is above 6.5V, for example (at turn on, buck converter (301) is not required to regulate anything, and may just have an output voltage that is higher than 5V, for example).

In one embodiment, transistor (316), transistor (320), transistor (321), diode (322), resistor (323), resistor (324), resistor (325), resistor (319) and transistor (345) are configured to ensure that transistor (345) is turned on only when voltage supply (330) is high enough and when control circuit (318) is working properly (e.g., ready and/or sending the proper signals). Transistor (321) will turn on when (I) voltage supply (330) is at an adequate level and (II) when control circuit (318) is working properly (e.g., ready and/or sending proper signals). First, transistor (321) may turn on only when voltage supply (330) is on and higher than, for example, 2.6V. At this voltage level the threshold formed by diode (322) and resistors (324) and (325), as well as the VBE (base-emitter) voltage of transistor (321) activates transistor (321), if transistor (320) is not turned on. Second, if control circuit (318) is operative or working properly, it will provide a high voltage to the base or gate of transistor (316) to turn on transistor (316). Transistor (316) may be the internal part of control circuit (318) with an open collector or open drain. When transistor (316) is on, transistor (320) is off, which prevents transistor (321) from being turned off if the voltage supply (330) is high enough (e.g., above 2.6V). When transistor (316) is turned off because control circuit (318) is not working properly for lack of power or simply not ready, and when logic supply (330) is high enough, resistor (323) is able to turn transistor (320) on. Once transistor (320) is on, the gate or base of transistor (321) is connected to the ground via transistor (320); and thus transistor (321) turns off, which in turn turns off transistor (345).

When the above described two conditions (I and II) are both met, transistor (321) is turned on to allow transistor (345) to turn on the drive voltage to drive the "Vi to drive stage" output (331). When transistor (321) turns off, the resistor (319) is not sufficient to turn on transistor (345) and thus the "Vi to drive stage" output (331) is disabled by the transistor (345).

In one embodiment, when (a) voltage supply (330) becomes high enough, at for example above 2.6V and (b) control (318) is not working properly to turn on transistor (316), the voltage level after dropping past resistor (323) is high enough to feed into the base or gate of transistor (320), which then is able to turn transistor (320) on or put it in saturation mode. Transistor (320) may be turned on only if transistor (316) is off, which indicates that the control circuit (318) is not ready. In such a case where the transistor (320) is turned on in saturation mode, the base or gate of transistor (320) is connected to ground via the transistor (316) in saturation mode. When transistor (320) is on, a voltage near a ground value is sent to the gate or base of transistor (321) via transistor (320), therefore turning transistor (321) and transistor (345) off (since the control circuit (318) is not be ready, as indicated by the state of transistor (316)). In one embodiment, transistor (316) serves as a switch to toggle transistor (320). If transistor (316) is turned off, as discussed above, transistor (320) may be on if the voltage supply (330) is high enough. Likewise, if transistor (316) is turned on, a ground value is fed into the base or gate of transistor (320), therefore turning transistor (320) off. In one embodiment, transistor (316) is controlled by control circuit (318) to indicate the readiness of the control circuit (318). When ready, control circuit (318) provides a high enough voltage to the base or gate of transistor (316) to turn it on.

When transistor (321) is on, transistor (345) is on if the output (332) from the converter (301) is high enough. Likewise, if transistor (321) is off, transistor (345) is off even if the output (332) is high enough (for the lack of a sufficient voltage drop across bias resistor (319)). In one embodiment, transistor (345) is always off until the voltage drop across resistor (319) increases to turn transistor (345) on (e.g., when output (332) is high enough and transistor (321) is on for a connection to ground). In one embodiment, the transistor (345) is a PMOS transistor or a PNP bipolar junction type of transistor. In one embodiment, a sufficient voltage drop across resistor (319) from logic supply (332) is provided by transistor (321) turning on and therefore connecting the gate of transistor (345) to ground.

In one embodiment, the input voltage of buck converter (301) is between the input voltage (333) and the ground located at the bottom of the diode (305) and the capacitor (307). The output voltage of buck converter (301) is between the voltage (332) and the same ground located at the bottom of the diode (305) and the capacitor (307). Changing the duty cycle of MOSFET (302) changes the output voltage of buck converter (301). Control circuit (304) of buck converter (301) controls the duty cycle of buck converter (301) by controlling the gate of MOSFET (302). The input voltage of buck converter (311) is between the voltage on the node just above the capacitor (326) and the ground located at the bottom of the diode (325) and the capacitor (328). The output voltage of buck converter (311) is between the voltage on (330) and the same ground located at the bottom of diode (325) and the capacitor (328). Like buck converter (303), the control circuit (314) of buck converter (311) controls the duty cycle of buck converter (311) by controlling the gate of MOSFET (312).

The buck converter (311) is operative from 5V to 20V, for example. Thus, if input loss conditions are experienced, buck converter (311) is the last unit to turn off running from bypass capacitor (326) while buck converter (301) cannot regulate the circuit/system or is in off mode. The buck converter (311) also runs off control circuit (314), the control circuit (314) working in tandem with transistor (314) to effectively control buck converter in a feedback mechanism. Furthermore, in one embodiment, the auxiliary circuit (300) is to identify low power conditions and reduce buck converter (301) voltage from 11V to 7V, for example, by transistor (317), which may in turned be controlled by transistor (303), transistor (303) being able to control the buck converter (301) set point or ideal operating point by means of control circuit (304). When the control circuit identifies low power conditions, it may set transistor (317) on, which results in transistor (303) going off and voltage (332) being set to a low operation drive voltage (typically 7V, for example, which is the lowest power consuming mode voltage of the overall control circuit). MOSFET (303) also effectively serves as a switch to selectively lower the voltage output of buck converter (303) from 11V to 7V, for example. For most low voltage MOSFETS, two levels of drive voltage may be enough, but additional levels are possible.

One of the problematic aspects of operating a controller in a solar power environment is the unreliability of the power source during the early morning hours as well as during late evening hours, when faint blue light allows the panel to generate a high voltage, but presents barely enough current to properly operate. As a result, circuits often create a "false start" in which the voltages appear to be there, but as soon as the controller becomes active there is a drop or brown out or power outage, leading to the undesirable occurrence of unstable or even meta-stable modes, which may occur more frequently for small processors.

Figure 4:
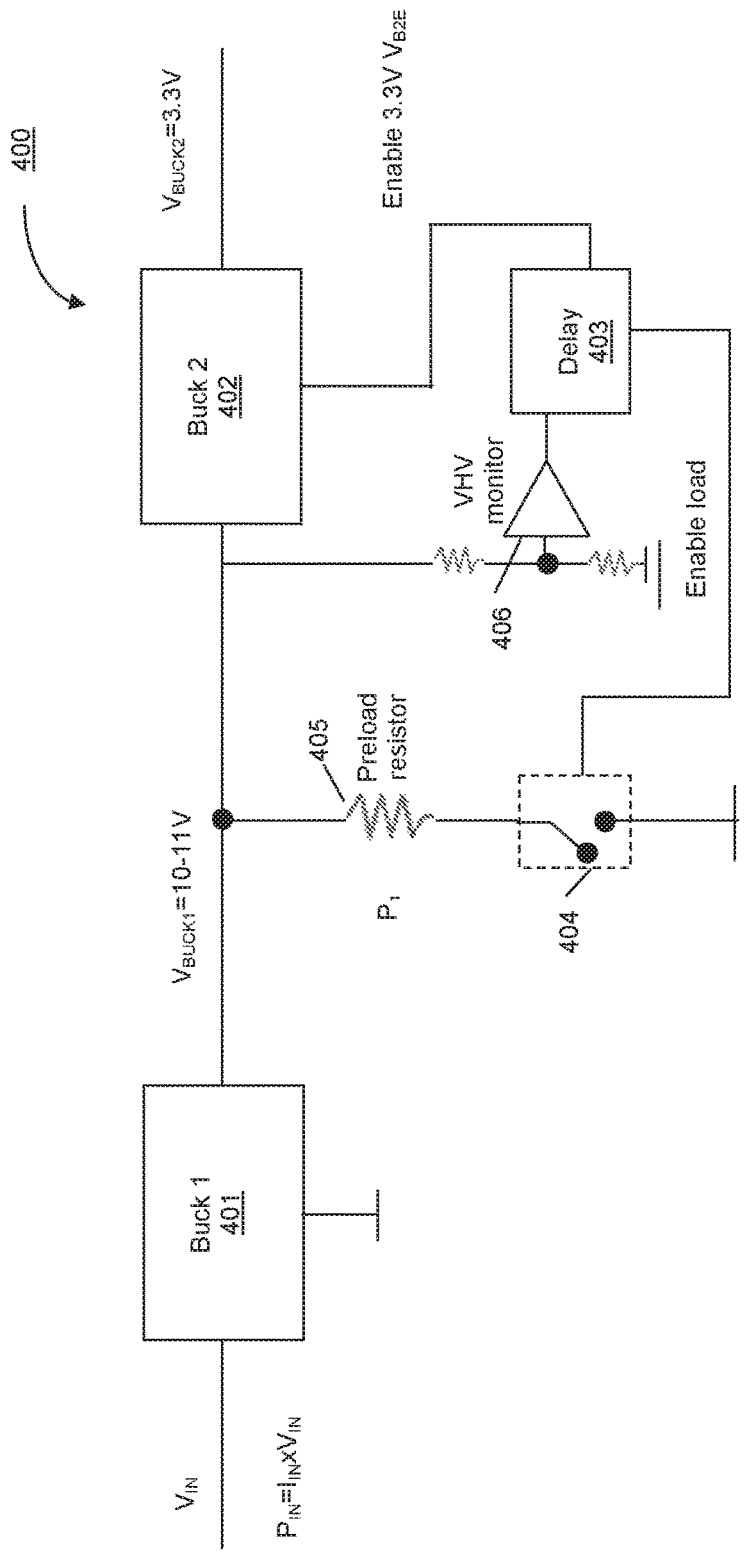
FIG. 4 shows a schematic description of a circuit practicing a system and method according to an embodiment of the present disclosure.

FIG. 4 shows a schematic description of a circuit practicing a system and method according to an embodiment of the present disclosure. Circuit (400) is another circuit that may be used as an auxiliary power supply or power supply module for a photovoltaic system, for example. In one embodiment, circuit (400) uses control logic to ensure that solar power is strong enough to enable output from the buck converter (402). Preload resistor P1 (405) is used to emulate the load of buck converter (402). If the output of buck converter (401) can support the load, the preload resistor P1 (405) is disconnected and the output of the buck converter (402) is connected to its load. Circuit (400) therefore can be used to address the false start problem that occurs when the solar panel is able to provide enough output voltage when it is not connected to the output, but not enough to sustain even a small current provided by the buck converter (402) to its load, such as a control logic, a control circuit, a microcontroller, etc.

In one embodiment, when the intermediate housekeeping voltage Vbuck1 (i.e., the voltage to operate an auxiliary microcontroller unit or MCU) is turned on by buck converter (401), Vbuck1 is initially used to power a preload resistor P1 (405), by turning on the switch (404), typically a FET or bipolar transistor controlled by one of the outputs of delay circuit (403) (also supplied by Vbuck1 but not shown here for clarity). The other output of delay circuit (403) suppresses at the same time buck converter (402). After the housekeeping voltage Vbuck1 is above a predefined threshold for the full delay period of delay circuit (403), the switch 404, and thus the preload resistor P1, is turned off to provide power for the load of the buck converter (402) and the 3.3V logic is permitted to turn on and output from buck converter (402) in accordance with the enable signal from the delay (403).

Here, in FIG. 4, Vbuck1 is shown having an ideal range of 10-11V, for example, but this range has been merely provided for exemplary purposes and should not be taken to limit the disclosure to any particular range. This approach provides a smooth turn-on of the logic voltage. Typically, the load of resistor P1 (405) should exceed the load of buck converter (402) (buck converter's load being the MCU which is not shown), so that activating buck converter (402) does not crash the housekeeping voltage Vbuck1. Otherwise, the system of the circuit (400) might experience turn-on attempts which could not be completed, and as a result, the MCU could get stuck due to meta-stability effects of the MCU in some cases and some of the time.

In one embodiment, the loading of this approach is slightly unpredictable; and positive hysteresis is introduced in order to prevent oscillations. For instance, amplifier (406) may be used as a VHV (very high voltage) monitor in order to perform positive hysteresis to ultimately avoid oscillations. The reason this hysteresis modification is used is that at very low light conditions (where the sunlight is very dim for instance), solar panels can provide voltages that are high enough for turning on, but cannot ultimately provide sufficient power for the circuit that is to be powered by the buck converter (402). Therefore, identifying a simple threshold for voltage Vbuck1 does not stop unsuccessful turn-on attempts, if no hysteresis is employed in delay circuit (403) (meaning the delay starts only if Vbuck1 is, for example, at least 1.2 times the minimal input voltage of buck converter (402)). One way to prevent such attempts is to permit the system of circuit (400) to turn on only when it can stay on with the available given power. Power is measured by measuring the voltage on resistor P1 (405) (plus any losses from the switch (404)) as represented by Vbuck1. In one embodiment, the delay circuit (403) can be omitted from the circuit (400), since this approach can also work with zero delay because of positive hysteresis. The above-described approach improves the performance of an electronic device mounted on a panel and a device having a MCU or a device similar to a MCU. The buck converter (401) part should be able to accept any variation in voltage during turn-on because it may not be sensitive.

In the above FIGS. 3-4, the voltage conversion section of the buck converters (e.g. 401, 402, 301, or 311) can be replaced with step-down converters or other converters known in the art.

In one embodiment, the features illustrated in FIG. 3 can also be used in the circuit in FIG. 4. For example, the enable circuit (320, 321, 322, 323, 324, 325, 345, and 319) in FIG. 3 can be used in the circuit of FIG. 4 to control the output of the voltage Vbuck1 to a drive stage via MOSFET (345). For example, a capacitor can be connected to the input of the buck converter 402 in FIG. 4, in a way as the capacitor 326 connected to the input of the buck converter 311 in FIG. 3. For example, the control block 318 used to control the enable circuit in FIG. 3 can also be used in the circuit of FIG. 4; and the circuit (317, 303, 308-310) and control block (304) in FIG. 3, used to reduce output voltage of the buck converter 301 when the input power from the solar panel is low, can also be used to control the output voltage of the buck converter (401) in FIG. 4. For examples, the resisters 340-343 connected to input and output of the buck converter 301 in FIG. 3 to detect low power conditions in FIG. 3 can also be used for the buck converter 401 in FIG. 4.

One application of the present disclosure is using the high voltages from buck converter (e.g. 301 or 401) (e.g. Vbuck1) to control MOSFET switches used in a solar panel energy system and the low voltage from buck converter (e.g. 311 or 402) can be used to power control circuits for a solar panel using the power generated by the solar panel. Examples of the MOSFET switches can be found in at least U.S. patent application Ser. No. 12/366,597, published as U.S. Pat. App. Pub. No. 2009/0133736, and U.S. patent application Ser. No. 12/411,317, now issued as U.S. Pat. No. 7,602,080, all the contents of which are incorporated herein by reference. Examples of the control circuits can be found in at least U.S. patent application Ser. No. 11/875,799, published now as U.S. Pat. App. Pub. No. 2008/0097655, and U.S. patent application Ser. No. 12/411,317, now issued as U.S. Pat. No. 7,602,080, the contents of which are incorporated herein by reference.

Figure 5:
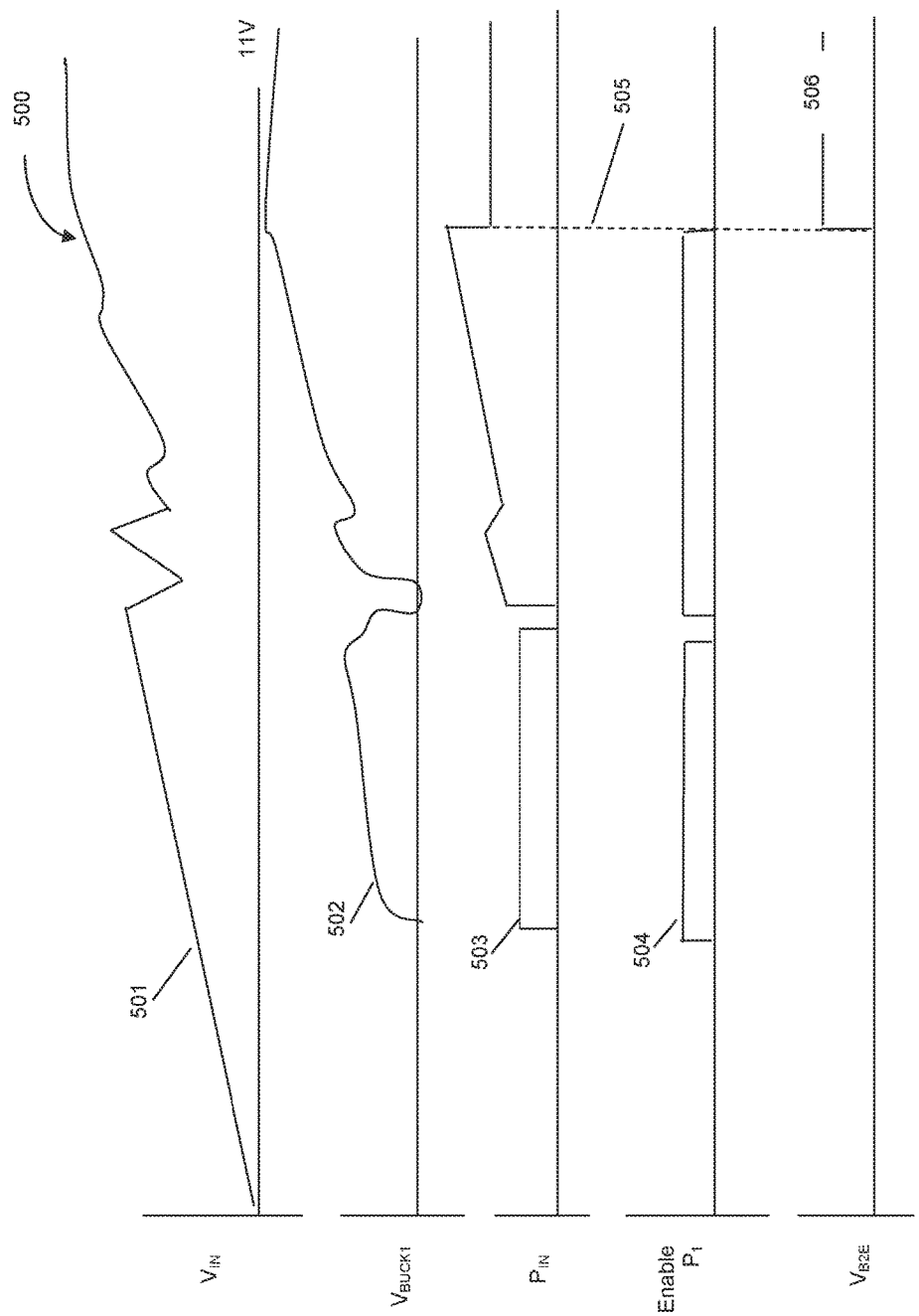
FIG. 5 shows a schematic description of an example startup behavior of wave forms, according to an embodiment of the present disclosure.
Figure 6:
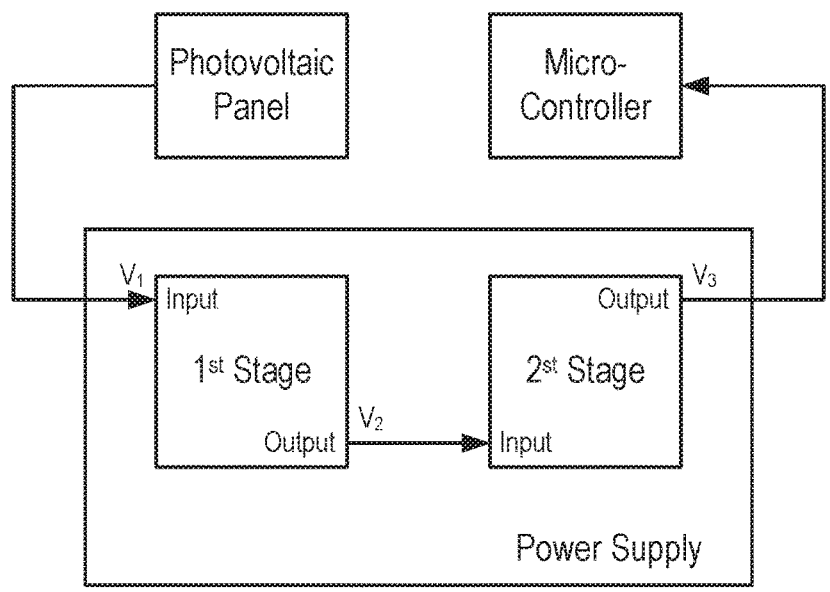
FIG. 6 shows a power supply according to one embodiment.

FIG. 5 shows a schematic description of an example startup behavior of wave forms, according to an embodiment of the present disclosure. Wave forms (500), where the x-axis is time, may be generated from running the circuit (400) shown in FIG. 4, above, through simulations. Curve (501) may represent the Vin (or input voltage value) from the solar panel into buck converter (401). Curve (502) may represent the output of buck converter (401), which is Vbuck1 as shown in FIG. 4. Curve (503) may represent the power used from the panel. Note in FIG. 5 the drop of power at dotted line (505) when the photovoltaic system is turned on. At dotted line (505), the second stage is turned on and therefore the system is turned on. Curve (504) may represent the output of delay circuit (403) controlling switch (404) and curve (506) may represent the VB2E value coming out of delay circuit (403) ultimately used to control buck converter (402). Also, Curve (504) may show that the preload resistor P1 (405) may be turned off after Vbuck1 passes a designated threshold level and a delay time has passed.

It is clear that many modifications and variations of this embodiment may be made by one skilled in the art without departing from the spirit of the novel art of this disclosure. These modifications and variations do not depart from the broader spirit and scope of the present disclosure, and the examples cited here are to be regarded in an illustrative rather than a restrictive sense.

The performance of solar modules can vary significantly with temperature. A system capable of measuring temperature can implement methods for controlling the voltage, power output, or the efficiency of one or more strings of solar module controllers using module temperature as a factor. For example, a formula presented by Nalin K. Gautam and N. D. Kaushika in "An efficient algorithm to simulate the electrical performance of solar photovoltaic arrays," Energy, Volume 27, Issue 4, April 2002, pages 347-261, can be used to compute the voltage of a solar module at the maximum power point. Other formulae can also be used.

Many variations can be applied to the above disclosed systems and methods, without departing from the spirit of the present disclosure. For example, additional components can be added, or components can be replaced. For example, rather than using a capacitor as primary energy storage, an inductor can be used, or a combination of inductor and capacitor. Different types of transistors—such as MOSFET or bipolar transistors—may also be used interchangeably, with appropriate adjustments to voltage and other settings. Also, the balance between hardware and firmware in the micro controllers or processors can be changed, without departing from the spirit of the present disclosure.

It is clear that many modifications and variations of this embodiment can be made by one skilled in the art without departing from the spirit of the novel art of this disclosure. For example, the systems and method herein disclosed can be applied to energy generating systems besides solar photovoltaics (e.g., windmills, water turbines, hydrogen fuel cells, to name a few). Also, although specific voltage values and thresholds have been mentioned, other reference points for the target voltage can also be used. These modifications and variations do not depart from the broader spirit and scope of the present disclosure, and the examples cited here are to be regarded in an illustrative rather than a restrictive sense.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. An apparatus, comprising:
a micro-controller;
a first stage power converter to generate a first output from a direct current input;
a switchable load powered by the first output;
a control circuit powered by the first output; and
a second stage power converter connected to the first stage power converter and configured to convert the first output to a second output;
wherein the control circuit is configured to block the second stage power converter from powering the micro-controller using the second output in a time period that is after the control circuit is powered by the first output and before a predefined condition is met in the control circuit; and
wherein the control circuit is configured to signal the switchable load to be in a first state of consuming the first output during the time period and to be in a second state of not consuming the first output after the time period.

2. The apparatus of claim 1,
wherein the predefined condition includes a voltage of the first output reaching a threshold.

3. The apparatus of claim 1, wherein, when the switchable load is in the second state, the voltage above the threshold is sufficient to power the second stage power converter to operate the micro-controller for at least a predetermined period of time during which the direct current input to the first stage power converter has diminishing power.

4. The apparatus of claim 1, wherein the switchable load comprises:
a resistive device; and
a switching device connected to the resistive device, wherein the switching device is turned on in the first state to connect the resistive device to the first output and turned off in the second state to disconnect the resistive device from the first output.

5. The apparatus of claim 1, wherein the control circuit delays a first signal instructing the switching device to change from the first state to the second state to generate a second delayed signal that instructs the second stage power converter to change from not powering the micro-controller to powering the micro-controller.

6. The apparatus of claim 5, wherein the control circuit comprises:
a hysteresis amplifier coupled to the first output to generate the first signal; and
a delay circuit coupled to the first signal to generate the second delayed signal.

7. A method to supply power, the method comprising:
generating, by a first stage power converter, a first output from a direct current input;
powering a control circuit using the first output;
generating, by a second stage power converter connected to the first stage power converter, a second output from the first output from the first stage power converter;
blocking, by the control circuit during a time period that is after the control circuit is powered by the first output and before a predefined condition is met in the control circuit, the second output from the second stage power converter from powering a micro-controller;
consuming, by a switchable load in a power absorption circuit, a portion of the first output from the first stage power converter during the time period;
powering the micro-controller using the second output from the second stage power converter after the time period; and
stopping, by the control circuit and after the time period, the switchable load from consuming the first output from the first stage power converter.

8. The method of claim 7, wherein the predefined condition includes a voltage of the first output reaching a threshold.

9. The method of claim 7, further comprising:
signaling, by the control circuit, the switchable load to be in a first state of consuming the portion of the first output during the time period; and
signaling, by the control circuit, the switchable load to be in a second state of not consuming the first output from the first stage power converter after the time period.

10. The method of claim 9, wherein, when the switchable load is in the second state, the voltage above the threshold is sufficient to power the second stage power converter to operate the micro-controller for at least a predetermined period of time during which the direct current input to the first stage power converter has diminishing power.

11. The method of claim 9, wherein the switchable load includes a resistive device, and a switching device connected to the resistive device; wherein the method further includes:
turning on the switching device to place the switchable load in the first state in which the resistive device is connected to the first output; and
turned off the switching device to place the switchable load in the second state in which the resistive device is disconnected from the first output.

12. The method of claim 9, further comprising:
delaying, by the control circuit, a first signal instructing the switching device to change from the first state to the second state; and
generating, via the delaying, a second delayed signal that instructs the second stage power converter to change from not powering the micro-controller to powering the micro-controller.

13. The method of claim 12, further comprising:
generating the first signal using a hysteresis amplifier coupled to the first output.

* * * * *